May 7, 1935.  A. W. REYNOLDS  2,000,097
SPRING TOOTH HARROW
Filed Oct. 20, 1933   2 Sheets-Sheet 2
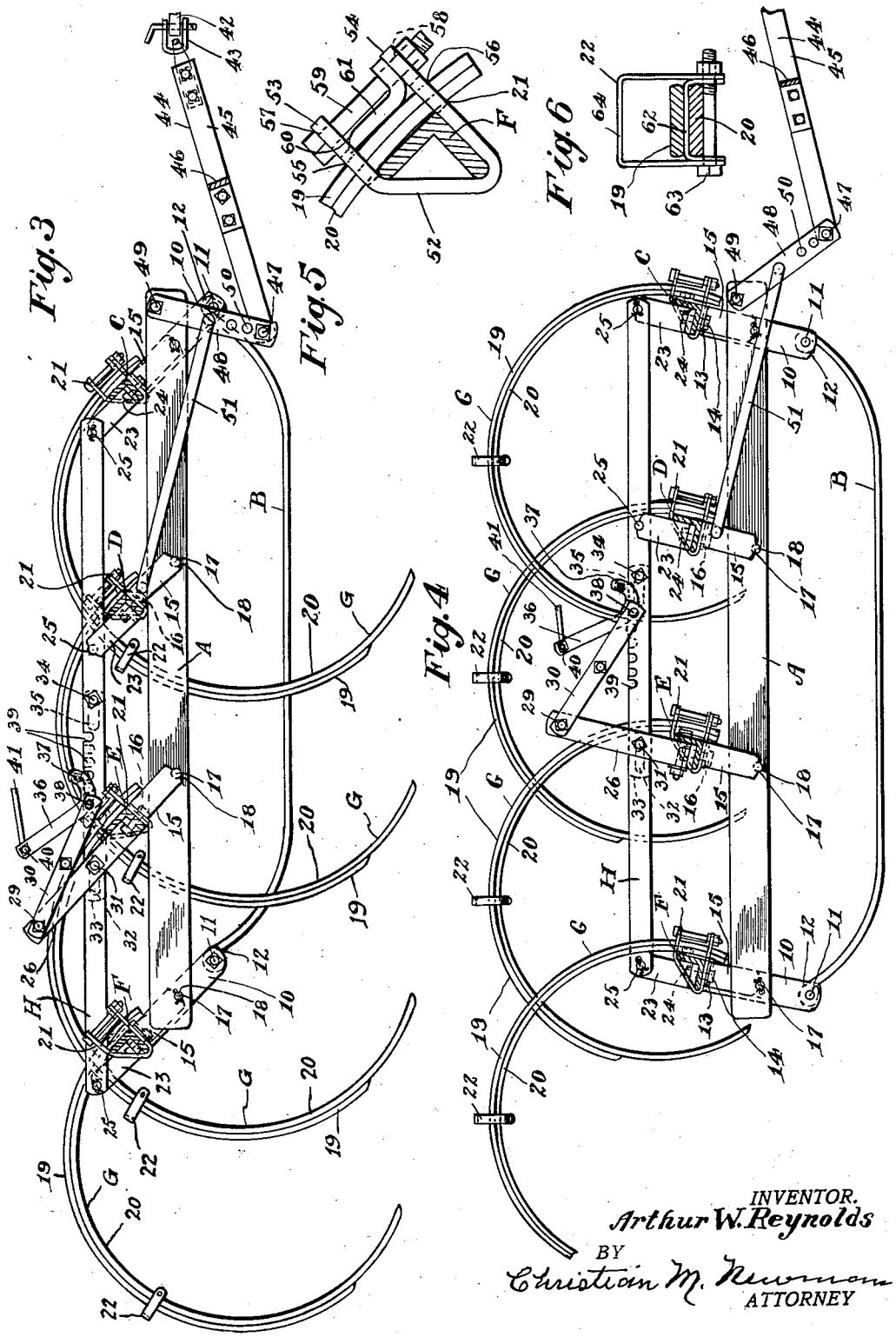
INVENTOR.
Arthur W. Reynolds
BY
Christian M. Newman
ATTORNEY Patented May 7, 1935

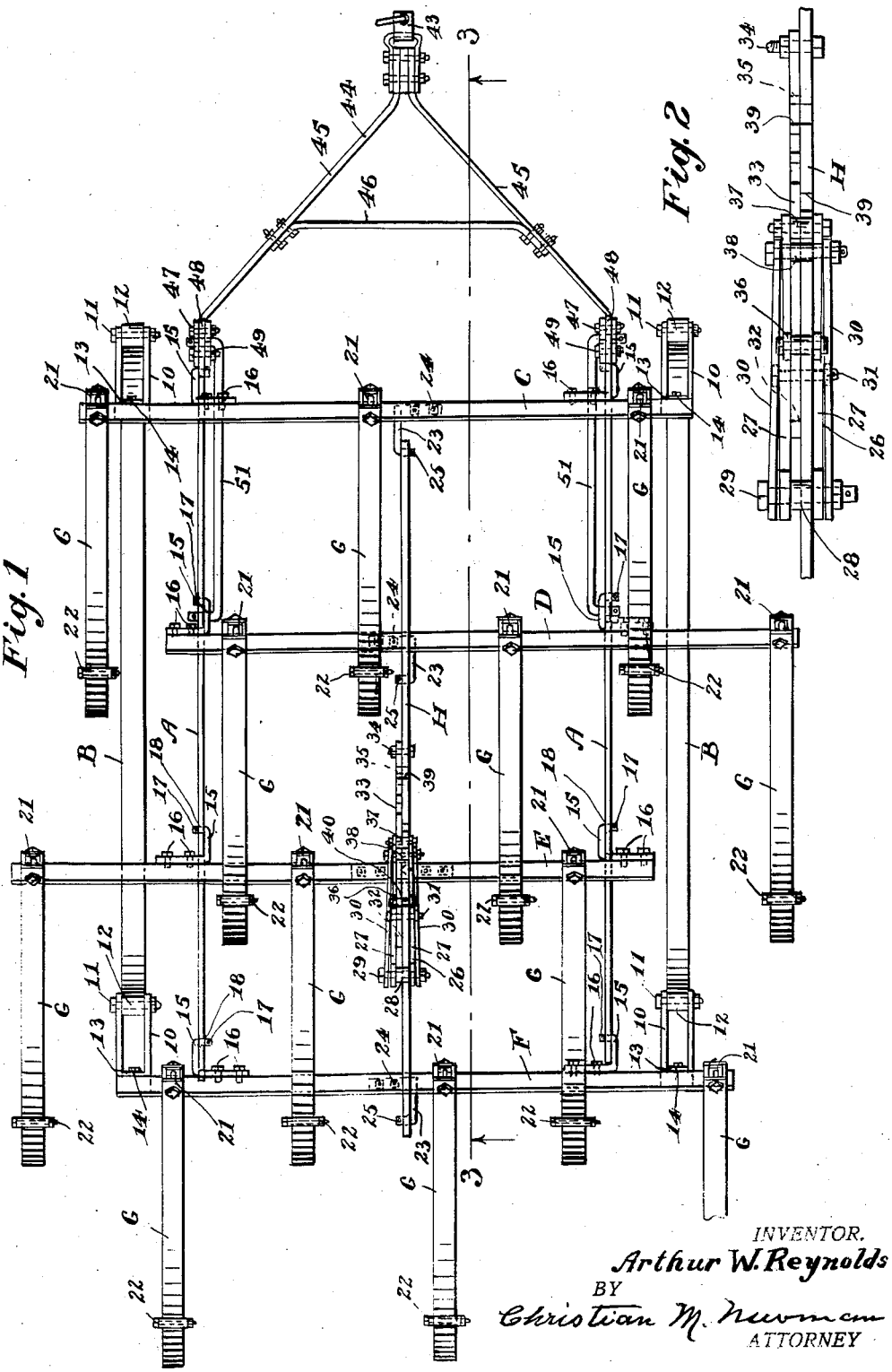

2,000,097

UNITED STATES PATENT OFFICE 2,000,097

SPRING TOOTH HARROW

Arthur W. Reynolds, Newtown, Conn.

Application October 20, 1933, Serial No. 694,404

18 Claims. (Cl. 55—104)

My present invention relates to spring-toothed harrows and has for its object to improve the construction of implements of this class and particularly to provide a harrow with a so-called power lift, that is a lift which may be operated by the power of a tractor when hitched thereto. By the expression "power lift", I mean the means whereby the teeth of the harrow are lowered and raised with respect to the frame, as employed for cultivating or travelling to and from the fields to be worked, and also as may be necessary during the harrowing operation in order to clear trash from the teeth.

My improved power lift is particularly designed to be operated by the driver when in position on the tractor seat, through the use of rope or similar means connected to the harrow.

An object of the invention is to provide a harrow with a relatively compact frame and tooth bar formation, having spring teeth of sufficiently large circular formation to extend rearward and over the adjacent rear tooth bar, thereby affording increased freedom of action of the teeth and insuring a raising and lowering movement thereof with relation to the bar in a manner to insure the stripping of trash from the teeth by vertical movements of the teeth, should trash accumulate against the teeth of the harrow.

By reason of the use of large spring teeth, as above suggested, I am able to arrange my tooth bars closer together, and employ four tooth bars in the harrow instead of the customary three without appreciably lengthening the harrow, and at the same time provide the usual number of teeth to move the required width of soil and still space them further apart on each bar with less liability of gathering trash.

A further object of my invention is to provide a harrow with a pair of one-piece runners that are of a length substantially equal to that of the frame of the harrow and adapted to be moved backward and forward and up and down when the teeth are raised or lowered.

My present form of harrow is adapted for the use of two-piece teeth, that is a tooth having a strengthening or helper member fitted to the rear side of the tooth. I further provide an improved form of clamp for the attachment of the teeth to the tooth bars in a way to prevent slipping. I also provide a yoke for these two-piece teeth that is secured to the tooth member, and allows the rear member or helper to work freely up and down, but prevents it from moving sidewise of the tooth member.

A further object of the invention is to provide an improved design or spring-tooth harrow, the parts of which are made of like bars or strips of steel of limited size and shapes, thereby limiting the number of different pieces, and thus reducing the cost of manufacture. It will also be obvious that the design of my present harrow readily permits it to be used in series, if desired, in which case they could be connected with an evener-bar.

These and such other objects as may hereinafter appear are attained by my device, embodiments of which are illustrated in the accompanying drawings, in which Fig. 1 shows a plan view of a spring-tooth harrow constructed in accordance with my invention, the teeth of which are lowered as in an operating position;

Fig. 2 shows an enlarged detailed plan view of the trip mechanism shown in Fig. 1, for adjusting the position of the harrow teeth;

Fig. 3 is a longitudinal sectional view taken on line 3—3 of Fig. 1, the teeth being in the same position shown in Fig. 1;

Fig. 4 is a similar longitudinal sectional view, with the teeth in raised positions, as after being lifted by a forward movement of the tractor;

Fig. 5 shows an enlarged cross sectional view of the clamping means for attaching the spring teeth to the tooth bars; and Fig. 6 shows a sectional elevation of the spring clamp employed for movably supporting the helper or stiffening tooth member in helping relation to the longer front member.

In addition to the features of my improved harrow heretofore referred to, it will be apparent that a novel form of power lift is employed whereby the teeth may be not only raised and lowered from one extreme to the other, but may be adjustably positioned at several intermediate points to insure the teeth of the harrow working at different depths in the soil.

My present harrow is designed to insure flexibility in operation, better to accommodate itself to rough ground, though it is durably constructed and adapted for comparatively heavy work.

Referring in detail to the reference characters marked upon the drawings, A—A represent the two side-bars which, as will be seen from the drawings, are made of elongated flat steel plates of substantially equal length and arranged in spaced relation to each other. These frame members, together with the parts connected to and above them, are supported by the two runners B—B, when the latter are adjusted to slide upon the ground, and are positioned outside of the two side-bars. Each of the two runners is indirectly connected to the side-bars with which they are associated through four runner brackets 10—10 attached to the front and rear tooth bars, one of which is hingedly connected to each end of the two runners, by means of bolts 11—11.

These runner brackets, while made of one piece, comprise an intermediate flat portion 13 and two side plate members between which the ends of the runners, which are bent around to form eyes 12, are positioned. The flat portions 13 are pierced and attached to the underside of one flange of the angular shaped tooth bars C and F by means of bolt 14. This obviously forms a support for the forward and rear tooth bars C and F, as upon the ends of the runners.

In addition to the forward and rear tooth bars, I also employ intermediate tooth bars D and E. All four of these tooth bars are connected with the side frame members A by bearing arms 15 which are formed of a flat steel plate having a right-angularly disposed upper end portion that is attached to the underside of the lower leaf of the angular tooth bar by means of short bolts 16. The lower end of these arms are rounded and disposed at a right angle to form a bearing portion 17 that is positioned in aligned holes 18 in the side bars and loosely secured therein as with cotter pins or other suitable means. This connection obviously permits the said bearing arms 15 to be easily swung backward and forward, as will later be disclosed.

These tooth bars, connected in this manner, obviously form a part of the frame structure since they indirectly connect one side bar with the other, and form the only crosswise means of support. They each also serve to support and carry a series of spring teeth G, preferably three in number. These teeth, as herein shown, are formed of two spring-steel pieces each of which is bent circularly; the rear member 19 is shorter than the front member 20 and may be regarded as a strengthening or helper member. The two shank portions of these teeth are secured to the angular shaped tooth bars by novel tooth clamping means, as indicated by 21, see Fig. 5, and as will again be referred to. The two teeth members are also, though flexibly, connected intermediate of their length by a novel form of clamp 22, as shown in Fig. 6, which permits of a limited amount of freedom of the helper member, yet insures its alignment at all times with the main tooth member 19 and which, like the other said clamping means, will be further referred to in detail. While the spring teeth herein mentioned are made of two pieces, yet it will be obvious that the harrow can be equipped with teeth formed of one piece, and will operate equally as well for light cultivation.

A standard 23 is secured to the intermediate portion of each tooth bar C, D, F by means of bolts 24 in a manner to be disposed upward. These standards are like the bearing arms 15, being provided with flat right-angular bends upon one end for attachment to the tooth bars C, D and F, and with a right-angularly disposed rounded end 25 that extends through aligned holes in the adjusting bar in a way to form swinging engagements therewith.

An adjusting lever 26, which is preferably constructed somewhat like the bearing arm 15, is formed of two single strips of metal, the lower end portions of which are bent at right angles forming flat connecting portions for attachment to the tooth bar E by means of suitable bolts, and is disposed upward to form two spaced apart side members 27—27 that straddle the before mentioned adjusting bar H. A ferrule 28 that forms a spacer is positioned between the upper end portions of these two side members 27—27 of the adjusting lever, and a bolt 29 extends through aligned holes of the lever and the sleeve to connect them together, and to also form a pivotal connection with one end of a two-piece lever arm 30—30 that connects with and forms a part of the trip mechanism by means of which the position of the teeth may be adjusted by the operator of the tractor.

This adjusting means is associated with the adjusting bar and consists in mounting a loose bolt 31 in a hole of the adjusting lever 26 and passing it through a hole in the adjusting bar H, and a slot 32 in an adjusting plate 33 that is adapted to be slid along side of the adjusting bar, the forward end of the said plate being also supported by a bolt 34 that is carried by the adjusting bar and extends through a slot 35 in said plate. This adjusting bar, as shown, serves to connect the standards upon the tooth bars whereby they are all moved simultaneously to swing the tooth bars forward and backward. The amount of this movement is determined by the engaged position of the forward end of the lever arm 30 and lock pin 38 with respect to the adjusting bar.

The relative or engaged position of the forward end of the adjusting arm may be changed to limit the amount of swinging movement of the bearing arms and the tooth bars, and thereby the relative position of the teeth with respect to the runner, through the medium of a trip arm 36 which, like its associated member, is made of two like parts in a manner to serve to carry a roller 37 between their up-turned forward ends, so that the said roller will roll along on the top edge of the adjusting bar and its adjusting plate at such time as when the lock pin 38 also carried by the trip arm 36 is raised out of engagement with registered notches 39 in the top edge of the adjusting bar and the adjusting plate. The upwardly disposed end of the trip arm 36 is connected by a bolt 40 that serves to retain the two members of the arm in spaced relation and provides means for the attachment of one end of a tripping rope 41, the other end of which may be attached to the seat of the tractor in reach of the driver of the machine.

From the foregoing, it will be seen that before starting to harrow, and after the operator has decided upon the depth to be cultivated, he proceeds to adjust the teeth to their proper position to insure the desired depth of cultivation, whereupon the operator raises the trip arm 36 and disengages the lock pin 38 from the notches 39 and permits the connected ends of the trip arm and lever arm to move along over the notches in the top edge of the adjusting bar and adjusting plate, whereupon he then proceeds to loosen the bolt 34 and move the adjusting plate 33 longitudinally with respect to the adjusting bar H and the bolts 31 and 34, until the required notch of the adjusting plate is brought to register with the required notch of the adjusting bar, whereupon the nut of the bolt 34 is again tightened, fixing the adjusting plate preparatory to further movement of the lever-arm and trip-arm. It will be borne in mind that at this moment the adjusting bar and the adjusting plate are so positioned with respect to each other that there remains but the one pair of notches open, the remaining top edge portion being closed, forming an uninterrupted surface upon which the roller 37 carried between the two short ends of the trip arm may roll along on the top of said adjusting bar and adjusting plate until the locking pin 38 comes to register with the said registered notches and is seated in one of them in a way to establish a new fulcrum point with respect to which the adjusting lever and other movable parts of the harrow are operated. In this respect, it will be borne in mind that this adjustment is one that is made but occasionally, and usually before starting to cultivate and after it has been decided to what depth the ground is to be worked.

As before suggested, this type of harrow is designed to be operated by most any of the improved types of tractors, and is hitched to the rear end of the draw head which, in the accompanying drawings, I have designated as 42. This draw head, as shown, includes a clevis 43 which is detachably connected to the draw head and serves to connect the forward end of the hitch beam 44 which in this case is made up in substantially an A shape, including angularly disposed side members 45 and a cross brace 46. The said angularly disposed side members are slightly bent at their rear ends to form parallel rearwardly extending end portions that are pierced to receive bolts 47 which serve to adjustably connect with the lower ends of the double draw bar lever 48 between which the said punched end portions of the angularly disposed members extend.

There are two of these double draw bar levers, one for each leg of the hitch beams, which serve to support the same beneath and in swinging relation to the side bars, the said levers being positioned one on each side of the draw bar and hingedly connected thereto, as by means of a bolt 49. The lower end portion of the draw bar lever is provided with a series of holes 50 to receive the bolt 47 that connects them with the hitch beam so as to provide for adjustable attachment of one to the other.

A push rod 51 is provided in each side of the machine for connecting the said lever 48 with the bearing arm 15 that carries the tooth bar D. The ends of this push rod, which in the drawings is shown to be round, are bent at right angles, one being loosely positioned in a hole in the said lever 48 and the other similarly positioned in said bearing arm, a cotter pin or other practical means being employed to loosely retain the ends of the push bar in position.

The tooth clamping means hereinbefore indicated as 21, see Fig. 5, and serving to secure the spring to the tooth bar, is shown attached to the tooth bar F, wherein the main tooth member 20 is positioned across the face of the upper leaf of the tooth bar and the adjoining spring member is closely associated therewith so that the two assembled spring members are disposed across the top and at a right angle to the length of the bar. A yoke 52 that is mounted upon the tooth bars, is suitably shaped to engage the edge portions of the tooth bar and having elongated openings through the upwardly disposed parallel side portions 53 and 54.

These two parallel side portions are each provided with openings 55 and 56 to receive the assembled end portions of the two leaves of the tooth, and in addition are provided with holes 57 and 58 to receive the clamping bolt 59 used to draw the two side portions of the yoke together, and to bind the teeth against the tooth bar.

The opening 55 to receive the spring is formed sufficiently large to receive the bevelled end 60 of a wedge 61 that is positioned between the edge of the clamping bolt and the top member 19 of the spring tooth. This wedge is so shaped and proportioned as to insure its pointed end being forced into the said opening 55 and its body portion pressed down upon the spring in a way to clamp it against the tooth bar, that is of course when the nut of the bolt is tightened. This construction in practice, I find, forms a very efficient clamp for attaching both a two-piece tooth and a one-piece tooth in a way to effectively hold the teeth against both sidewise and longitudinal movement.

The before mentioned clamp 22, shown in Fig. 6, which is employed for flexibly connecting the intermediate portion of the two tooth members comprises an inverted shallow U-shaped yoke member 62 that is positioned between the two members of the spring tooth, and has its parallel end portions extended down cross the edge portions of the main member 20. These end portions are provided with holes to receive a clamping bolt 63 that serves to unite the assembly and clamp the parts to the said main tooth member 20. A second, though relatively larger, inverted U-shaped yoke member 64 is also provided with aligned holes in its side portions to receive said bolt 63 in a way to be clamped against the sides of the end portion of the first mentioned yoke member 62. This last mentioned yoke member 64 thus applied serves to encircle the rear or stiffening tooth member 19 which normally rests upon the flat top side of the yoke 62, but which is free, due to the larger opening through the outer yoke, to work up and down, to a limited extent, as occasion may require in the operation of the harrow.

From the foregoing description of the construction of my harrow, it will be seen that the same, as shown in Fig. 3, is locked, through the tripping means, with the teeth in their lowered position ready to be drawn by the tractor, as for harrowing, the runner being more or less free and carried slightly above the average surface of the ground. If, however, the teeth become clogged with trash, such as weeds, straw or the like, it can be dislodged by the driver of the tractor by simply pulling upon the rope, dislodging the lock pin, leaving it to ride freely on the top edge of the adjusting bar, whereupon a slight pull by the tractor swings the draw bar lever 48 in a way to pull the adjusting bar forward, raising the teeth out of the ground so that their free ends ride up in close proximity to the tooth bars which act as strippers to dislodge the trash from the teeth. This being done, the driver of the tractor backs his machine to a point where the adjusting bar and connected parts are moved backward until the teeth are lowered and the lock pin engaged, thus forming a rigid hook-up that enables the harrow to be drawn forward, as in cultivation.

Having thus described my invention, what I claim and desire to secure by Letters Patent is:

1. In a harrow of the class described, the combination of a pair of spaced side-bars, a series of tooth bars each separately pivoted upon and crosswise above the side bars, teeth mounted upon the tooth bars and extended rearward over the next adjacent tooth bar, and means for uniformly swinging the tooth bars forward and backward in a manner to raise and lower the said teeth.

2. In a harrow of the class described, the combination of a pair of spaced side-bars, a series of arms hingedly connected thereto and extended upward therefrom, tooth bars supported upon an arm of each side bar and crosswise above the side bars, teeth mounted upon the tooth bars and extending rearward over the next adjacent tooth bar, and means for moving the tooth bars in a manner to raise and lower the teeth.

3. In a harrow of the class described, the combination of a pair of spaced side-bars, a series of tooth bars each separately pivoted upon and crosswise above the side bars and adapted to swing forward and backward, teeth mounted upon the tooth bars and extended rearward over the next adjacent tooth bar, and means for swinging the tooth bars forward and backward in a manner to uniformly raise and lower the teeth.

4. A harrow comprising a frame, including a pair of spaced side-bars, a series of upwardly disposed bearing arms hingedly connected to each side-bar, a series of tooth bars supported upon said arms and crosswise above the side-bars, and teeth mounted upon the said bars and extended rearward over the next adjacent tooth bar, and means for moving the arms and tooth bars forward and backward in a way to raise and lower the teeth.

5. A harrow comprising a frame, including spaced side-bars, runners, an adjusting bar, a series of arms hingedly connected to the adjusting bar, a series of tooth bars each separately pivoted upon and crosswise above the side-bars, teeth mounted upon the said tooth bars and extended rearward over the next adjacent tooth bar, and means for uniformly moving the arms, tooth bars and runners forward and backward in a way to raise and lower the teeth like distances.

6. In a harrow of the class described, the combination of a frame including a pair of spaced side-bars, a series of tooth bars each separately pivoted upon and crosswise above the side-bars and adapted to swing forward and backward, teeth mounted upon the said bars and extended rearward over the next adjacent tooth bar, runners one end of each of which is hung to the forward tooth bar and the other end to the rear tooth bar in a way to be raised and lowered by the movement of said bar, and means for uniformly swinging the runners forward and backward in a way to raise and lower the same like distances.

7. In a harrow of the class described, the combination of a pair of spaced side-bars, a series of arms hinged to and disposed upward from the side-bars, a series of tooth bars supported upon said arms and crosswise of and above the side-bars, teeth mounted upon the said tooth bars and extended rearward over the next adjacent tooth bars, additional arms extended upward from the tooth bars, means connecting the last mentioned arms, and means for operating said connecting means to swing the tooth bars forward and backward in a manner to raise and lower the teeth.

8. A harrow comprising a frame, including a pair of spaced side-bars, a series of bearing arms hingedly connected to each side bar, a series of tooth bars supported on said arms and crosswise above the side bars, and teeth mounted upon the said bars and extended rearward runners hung from the side bars to support the harrow and adapted to be raised and lowered, means for moving the arms and tooth bars forward and backward in a manner to raise and lower the teeth and runners, and adjustable means for limiting the amount of said movement.

9. A harrow comprising a frame, including spaced side-bars, upwardly extended bearing arms hingedly connected to each side bar, a series of tooth bars supported upon the upper end portion of said arms, and crosswise above the side bars, and teeth mounted upon the said tooth bars and extended over the next adjacent tooth bar, and means for moving the arms and cross bars forward and backward in a way to raise and lower the teeth.

10. In a harrow of the class described, the combination of a frame including a pair of spaced side-bars, a series of tooth bars supported upon and crosswise above the side bars and adapted to swing forward and backward, and teeth mounted upon the said bars and extended rearward over the next adjacent tooth bar, runners hung from the frame in a way to swing longitudinally, and means for simultaneously swinging the runners, bars and teeth forward and backward in a way to raise and lower the teeth and runners.

11. In a harrow of the class described, the combination of spaced side bars, tooth bars, teeth upon the bars, arms secured to and depending from the tooth bars and hingedly connected to the side bars, an adjusting bar connecting the tooth bars for swinging movement and having a series of notches, a plate adjustably mounted against the adjusting bar having a series of notches in its edge portion adapted to register with those of the adjusting bar, means for securing the plate in adjusted positions, the adjusting bar and side bar in different longitudinal relations, and means for operating the adjusting bar to swing the cross bars in a manner to raise and lower the teeth.

12. In a harrow of the class described, the combination of a frame including spaced side bars, tooth bars, teeth upon the bars, an adjusting bar connecting the tooth bars for swinging movement and having a series of notches therein, a plate adjustably mounted against the adjusting bar having a series of notches in its edge portion adapted to register with those of the adjusting bar, means for securing the plate in adjusted positions, adjustable means for connecting the adjusting bar, the tooth bars and side bars in different relations, and means connectible with a tractor for operating the adjusting bar to move the tooth bars backward and forward in a way to raise and lower the teeth.

13. A harrow comprising a frame, including spaced side bars, upwardly extended bearing arms hingedly connected to each side bar, a series of tooth bars supported upon the upper end portion of said arms and crosswise above the side bars, teeth mounted upon the said tooth bars and extended rearwardly over the next adjacent tooth bar, means for moving the arms and tooth bars forward and backward in a manner to raise and lower the teeth, adjusting levers hingedly connected to the side bars, means connecting the levers and arms for swinging movement of the latter, and a hitch means attached to the lever.

14. In a harrow of the class described, the combination of spaced apart side-bars, a series of tooth-bars transversely mounted above the side-bars, teeth carried by said bars, depending arms secured to each tooth-bar and hingedly connected to the side-bars whereby the tooth-bars can be moved forward and backward above the side-bars, an additional upwardly disposed arm secured to each tooth-bar, an adjusting bar connected to said upwardly disposed arms and adapted to be moved forward and backward, additional depending arms secured to the forward and rear tooth-bars, runners connecting the last mentioned arms of one tooth-bar with those of the other, and means to fix the longitudinal position of the adjusting bar with respect to the side-bars.

15. In a harrow of the class described, the combination of spaced apart side-bars, a series of tooth bars, teeth carried by said tooth bars, depending arms secured to each tooth bar and hingedly connected to the side bars, an additional arm secured to each tooth bar and disposed upward, an adjusting bar connected to said upwardly disposed arms, additional depending arms secured to the end portions of the front and rear tooth bars, runners connecting the arms of one tooth-bar with those of another and adapted to be moved forward and backward, and means to fix the position of the runners longitudinally with respect to the side bars.

16. In a harrow of the class described, the combination of spaced apart side-bars, a series of tooth bars, teeth carried by said bars, depending arms secured to each tooth bar and hingedly connected to the side-bars, an upwardly disposed arm secured to each tooth bar, an adjusting bar hingedly connected to said upwardly disposed arms, additional depending arms secured to the tooth bars, adjustable means for connecting the adjusting bar, the tooth-bars and side-bars in different relations, a runner connected to said last mentioned arms, and means for simultaneously moving the adjusting bar and runner in opposite directions and raising and lowering the teeth.

17. In a harrow of the class described, the combination of spaced-apart side bars, runners positioned below the bars, an adjusting bar above the side bars, tooth bars each separately pivoted to and above the side bars and beneath the adjusting bar, teeth upon said tooth bars, connections between the runners, side bars and adjusting bar whereby the said runners, adjusting bar and tooth bars are simultaneously moved back and forward with respect to the side bars in a way to raise and lower the teeth and runners.

18. In a harrow of the class described, the combination of a pair of spaced-apart side bars, a pair of runners positioned below and supported from each end portion of the side bars, an adjusting bar carried by and above the side-bars, tooth bars pivotally connected to and above the side bars, teeth upon said tooth bars, connections between the runners, side-bars, and adjusting bar whereby the said runners, adjusting bar and tooth bars are moved back and forward with respect to the side bars in a way to uniformly raise and lower the teeth and runners, and means for adjusting the relative position of the adjusting bar with respect to the side bars.

ARTHUR W. REYNOLDS.